United States Patent [19]
Greene

[11] Patent Number: 4,612,826
[45] Date of Patent: Sep. 23, 1986

[54] TRANSMISSION THROTTLE VALVE MODULATOR RESPONSIVE TO BOTH POSITIVE MANIFOLD PRESSURE AND NEGATIVE MANIFOLD PRESSURE

[75] Inventor: Thomas L. Greene, Plymouth, Mich.

[73] Assignee: Ford Motor Company, Dearborn, Mich.

[21] Appl. No.: 701,059

[22] Filed: Feb. 13, 1985

[51] Int. Cl.[4] ................. B60K 41/16; F01B 31/00
[52] U.S. Cl. ............................ 74/863; 74/861; 92/6 D; 92/99
[58] Field of Search .............. 74/863, 861; 123/389; 92/48 R, 99, 13.2, 6 D, 13.6

[56] References Cited

U.S. PATENT DOCUMENTS

| | | | |
|---|---|---|---|
| 3,556,718 | 2/1971 | Wightman | 74/863 |
| 3,886,817 | 6/1975 | Paul et al. | 74/861 |
| 3,888,143 | 6/1975 | Kolehmainen et al. | 74/863 |
| 4,090,417 | 5/1978 | Burcz et al. | 74/864 |
| 4,142,427 | 3/1979 | Grevich | 74/863 |
| 4,181,065 | 1/1980 | Benjamin et al. | 92/48 X |
| 4,347,765 | 9/1982 | Leonard et al. | 74/869 |
| 4,367,662 | 1/1983 | Greene | 74/863 |
| 4,413,536 | 11/1983 | Whitney et al. | 74/869 |

Primary Examiner—Kenneth J. Dorner
Assistant Examiner—Joseph M. Rolnicki
Attorney, Agent, or Firm—Donald J. Harrington; Keith L. Zerschling

[57] ABSTRACT

A pneumatic throttle valve actuator for an automatic power transmission mechanism for use with a supercharged or turbocharged internal combustion engine wherein the relationship between manifold pressure and actuator force is changed when the engine manifold pressure changes from a positive pressure to a negative pressure or vice-versa. A correct shift point signal and a correct pressure regulator output thus are maintained regardless of whether the turbocharger or supercharger is active or inactive.

2 Claims, 2 Drawing Figures

TRANSMISSION THROTTLE VALVE MODULATOR RESPONSIVE TO BOTH POSITIVE MANIFOLD PRESSURE AND NEGATIVE MANIFOLD PRESSURE

GENERAL DESCRIPTION OF THE INVENTION

My invention comprises improvements in automatic transmission throttle valve actuators for use with automatic power transmission mechanisms. Such transmission mechanisms may comprise multiple ratio gearing that is controlled by fluid pressure operated clutches and brakes. An automatic control valve system cooperates with an engine driven transmission pump to deliver actuating pressure in controlled sequence to the clutches and brakes to effect appropriate ratio changes during operation of the transmission and engine driveline in any operating mode.

The control valve system includes a regulator valve for maintaining an appropriate control circuit pressure.

The improvements of my invention relate to a throttle valve actuator used to establish a pressure signal that is proportional to engine torque. That signal is used by the control valve system to initiate shift points as ratio changes from one ratio to another occur during the acceleration of the vehicle from a standing start to the cruising condition. It is used also to establish an appropriate regulated line pressure.

It is normal practice to establish an appropriate transmission throttle valve pressure by actuating the throttle valve with an actuator mechanism that responds to engine intake manifold pressure. If the engine is supercharged or if the manifold is pressurized with a turbocharger, a manifold pressure diaphragm actuator that is designed to operate with a negative pressure in the engine manifold will not produce a useful pressure signal at the transmission throttle valve. It is an object of my invention, therefore, to provide an actuator for a transmission throttle valve that appropriately responds to a positive pressure in the engine manifold as a result of turbocharging or supercharging as well as responding to a negative manifold pressure during the operating mode at which the turbocharger or supercharger is inactive. I have provided a modulator that will perform this dual function without the addition of special turbocharging pressure switches such as that shown in U.S. Pat. No. 4,142,427, and without the need for providing a complex check valve arrangement such as that shown in my earlier U.S. Pat. No. 4,367,662. I have provided this dual regulating function by using a common diaphragm for both the supercharging operating mode and the normal operating mode in which the engine manifold pressure is negative.

PARTICULAR DESCRIPTION OF THE INVENTION

Figure 1:
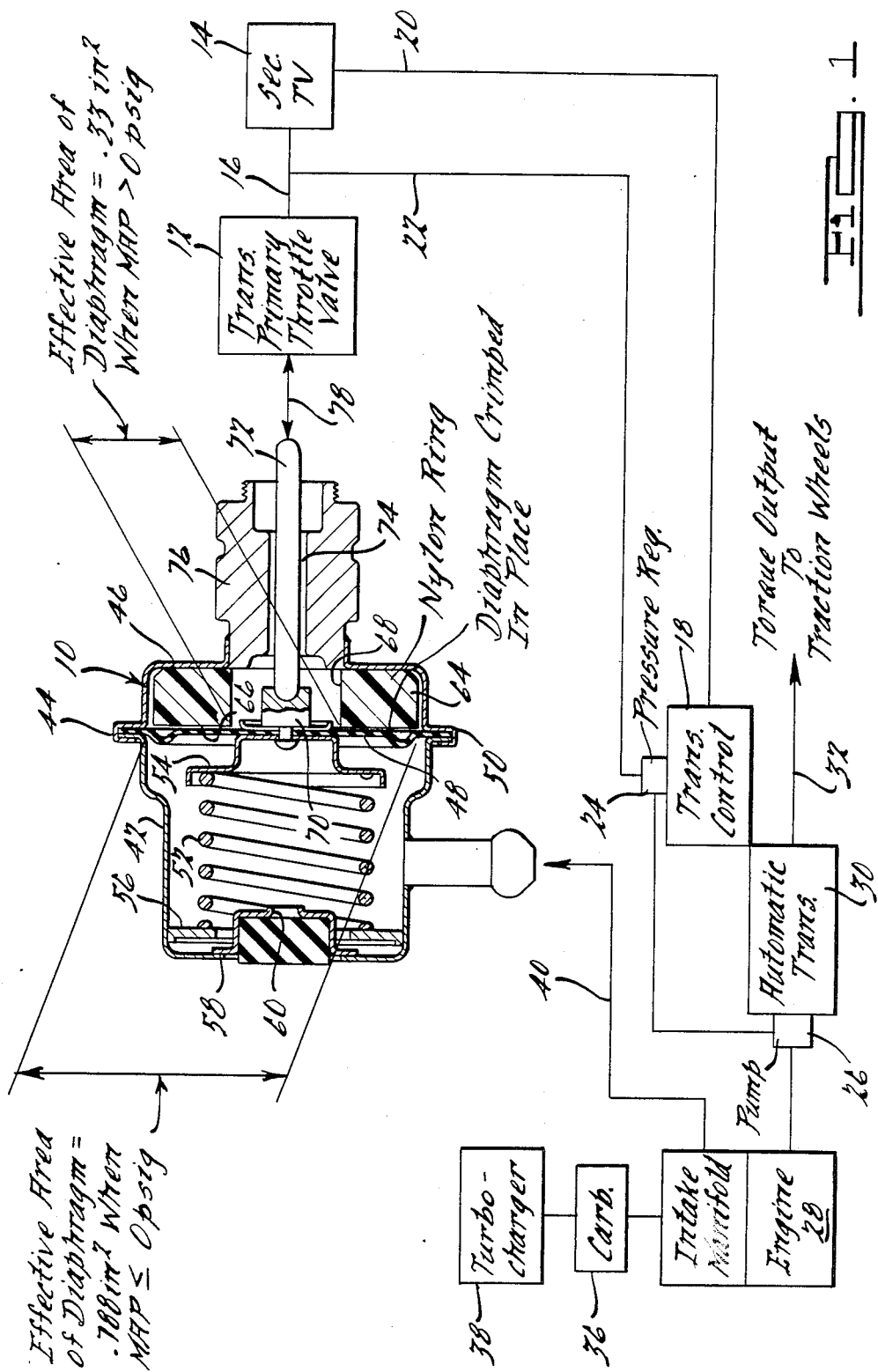
FIG. 1 shows in schematic form a cross section of the transmission throttle valve actuator that embodies the improvements of my invention.

The actuator of my invention is shown at 10 in FIG. 1. It is adapted to act on a primary throttle valve 12 which develops a primary throttle valve pressure that is distributed to a secondary throttle valve 14 to establish a shift timing pressure. The internal passage connecting the primary throttle valve with the secondary throttle valve is shown at 16. The output signal of the secondary throttle valve 14 is distributed to a automatic control valve circuit 18 through passage 20.

The primary throttle valve pressure is distributed from passage 16 through passage 22 to pressure regulator 24, which forms a part of the transmission control 18. The pressure regulator is supplied with fluid pressure from a transmission pump 26 which is driven by the engine 28.

For a description of a control circuit that embodies the general schematic layout illustrated in FIG. 1, reference may be made to Ford, U.S. Pat. No. 4,090,417, which discloses a diaphragm operated throttle valve, a booster valve which corresponds to the secondary throttle valve 14 of FIG. 1, an engine driven pump, a pressure regulator and an automatic control valve circuit for controlling fluid pressure operated clutches and brakes in an automotive vehicle transmission system. Another example of a transmission control valve circuit may be seen by referring to Ford, U.S. Pat. Nos. 4,347,765 and 4,413,536, although those disclosures describe a mechanically actuated transmission throttle valve.

Torque from the vehicle engine 28 is transferred through the automatic transmission 30 to a transmission drive shaft 32. The vehicle traction wheels are connected to the drive shaft 32 through a differential and axle mechanism, not shown.

The engine 28 is an internal combustion engine that is supplied with a air-fuel mixture from an intake manifold 34. Air is supplied to the manifold through a carburetor or other air-fuel mixing mechanism 36. In the driveline for which my improvement is adapted, a turbocharger 38 supplies air under pressure to the carburetor or air-fuel mixing device 36 thereby pressurizing the intake manifold 34. When the turbocharger is not in operation, the intake manifold 34 is under a negative pressure or vacuum. If the turbocharger 38 is effective, the pressure in the manifold may be positive. In either case the pressure, whether it is positive or negative, is distributed through passage 40 to the actuator 10.

The actuator 10 comprises a cylindrical housing 42 which is joined at its right hand margin 44 to the margin of a circular end cap 46 thereby forming a closed chamber. A flexible diaphragm 48 is enclosed by the housing 44 and is crimped in place on its margin between the joined periphery 44 and the registering periphery of the end cap 46 as seen at 50. An actuator spring under compression is enclosed in the housing 42 as shown at 52. Spring 52 is seated on a spring seat 54 which engages the center of the diaphragm 48. The opposite end of the spring 52 is seated on spring seat 56. The end wall 58 of the housing 42 has a central opening which may be secured and sealed by an elastic plug to provide a closed cavity within the housing 42. The sealed opening within the end wall 58 is shown at 60.

A sealing ring, preferably of Nylon, is inserted in the end cap 46 as seen at 64. It is provided with a flat annular surface 66 which is adapted to be engaged by the right hand face of the diaphragm 48. A central opening 68 is formed in the seal ring 64 and the hub 70 of the diaphragm 48 extends through the opening 68.

The hub 70 is engaged by an actuator stem 72 disposed in central opening 74 in a mounting sleeve 76 which is externally threaded to permit attachment to the automatic transmission housing, not shown.

The right hand end of the stem 72 is connected mechanically to the primary throttle valve 12 by a force transmitting connection 78.

When a force is exerted on the stem 72 in a right hand direction, the primary throttle valve pressure increases. This represents a high manifold pressure condition for the engine which corresponds to a high torque operating mode. If the engine throttle is relaxed, the intake manifold pressure decreases and becomes negative thereby resulting in a decrease in the force acting on the primary throttle valve and effectively decreasing the magnitude of the primary throttle valve pressure signal in passage 22 and in passage 16. This causes an appropriate adjustment in the magnitude of the regulated pressure level created by the pressure regulator 24, and it establishes also the correct input signal for the secondary throttle valve.

The net force acting on the stem 72 is the result of the algebraic sum of the force of spring 52 and the pneumatic force acting on the diaphragm 48.

If the engine is operating in its high torque mode with a turbocharger effective, the pressure in the housing 42 on the left hand side of the diaphragm 48 is a positive pressure. That pressure creates a force on the diaphragm which, when added to the force of the spring 52, will cause deflection of the diaphragm center portion. The effective area over which the pneumatic force acts is the area of the opening 68 since the right hand side of the diaphragm seals against the sealing face 66 of the sealing ring 64. On the other hand, if the pressure in the chamber 42 that is occupied by the spring 52 is a negative pressure, the area over which the pneumatic force acts is the entire area of the diaphragm 48 on the right hand side of the diaphragm 48 as atmospheric pressure acts on the diaphragm. This force subtracts from the spring force. Thus there is an effective diaphragm area that is larger when the manifold pressure is negative than the area that is present when the manifold is supercharged or subjected to the output of the turbocharger 38.

Figure 2:
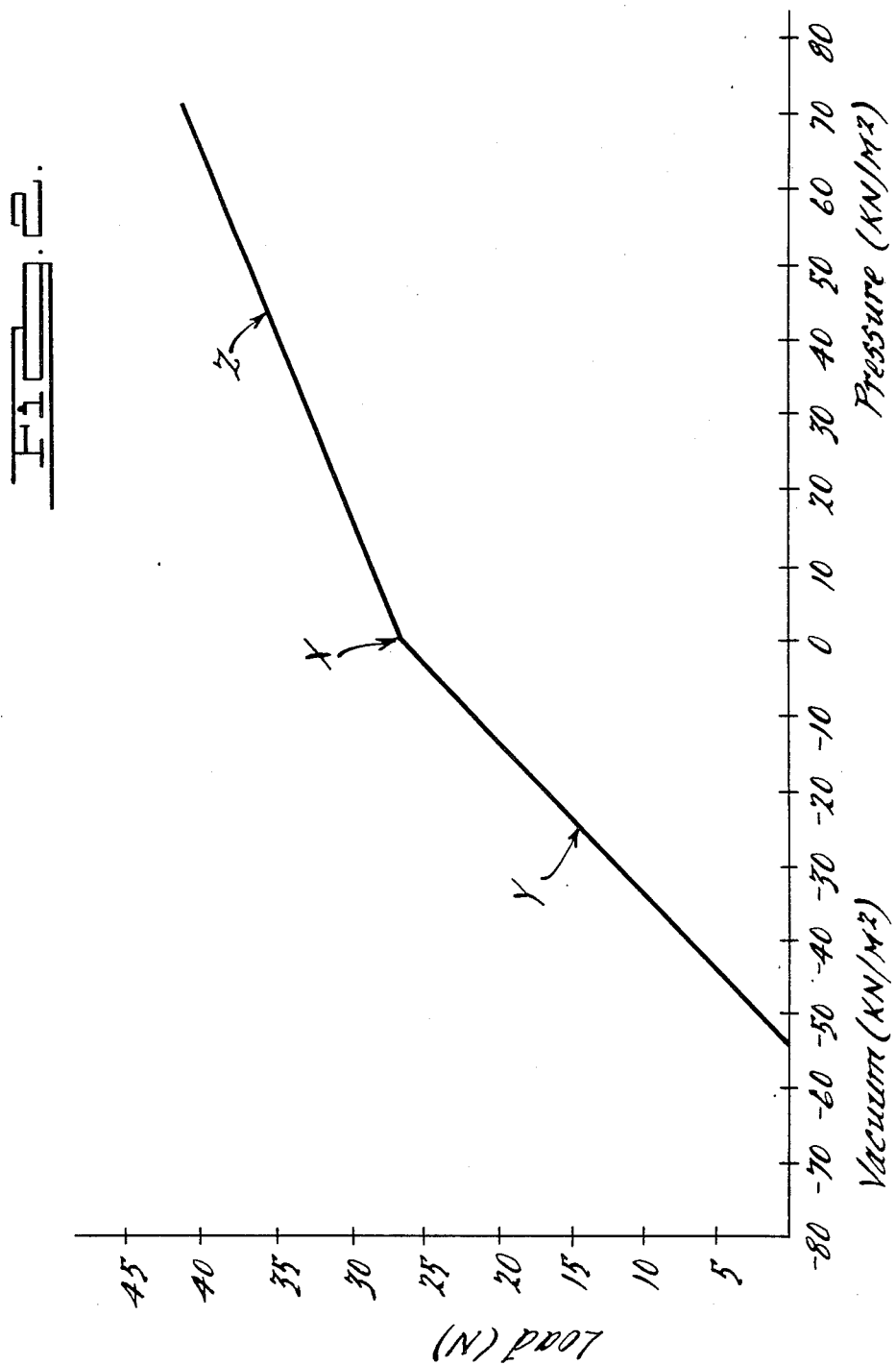
FIG. 2 is a chart that shows the operating mode for the modulator of FIG. 1. Specifically it discloses the relationship between the actuating force of the actuator and the manifold pressure or manifold vacuum.

As a result of the dual operating mode of the actuator 10 it is possible to obtain a relationship between the output force of the actuator and the manifold pressure or vacuum as illustrated in FIG. 2. When the manifold pressure is atmospheric, the load, according to a working embodiment of my invention, is approximately 27 newtons. This is represented in FIG. 2 by a reference point X.

The variation of actuator load with manifold pressure when the manifold pressure is negative is represented by the straight line Y. When the manifold is pressurized by a turbocharger or a supercharger, the slope of the line decreases as shown at Z.

In the FIG. 2 illustration the effective diaphragm area for the vacuum condition Y is 492,739 mm$^2$. The effective diaphragm area for the pressure mode Z is 206,300 mm$^2$.

In FIG. 2 both the vacuum and the pressure axes are represented in kilonewtons per square meter.

Having described a preferred embodiment of my invention, what I claim and desire to secure by U.S. Letters Patent is:

1. In a throttle valve actuator for an automatic transmission used with an internal combustion engine having an air-fuel intake manifold and having means on the air intake side thereof for supercharging the effective pressure therein;

an actuator housing, a diaphragm in said housing cooperating with said housing to define a cavity on one side of said diaphragm, means for establishing pneumatic communication between said intake manifold and said cavity, spring means in said cavity for urging said diaphragm in one direction, the effective force on said diaphragm being the sum of the force of said spring and the pneumatic force of the pressure of said manifold;

a seal ring situated in said housing and on the opposite side of said diaphragm and having a central opening of less area than the total area of the diaphragm, the central portion of said diaphragm being received over the said opening;

a valve stem adapted to establish a mechanical connection between said central diaphragm portion and a transmission throttle valve whereby said throttle valve is subjected to an actuating force that is the sum of the effective force of the pneumatic pressure on said diaphragm and the spring force;

said opposite side of said diaphragm being adapted to establish a seal on said seal ring whereby the effective area over which a positive pressure in said manifold acts is equal to the area of the opening in said seal ring and wherein effective area of said diaphragm over which a negative pressure on said manifold acts is the total area of said diaphragm.

2. The combination as set forth in claim 1 wherein the force on said valve stem varies linearly and proportionally with respect to the intake manifold vacuum with a first slope and wherein the same relationship varies with a lesser slope when the pressure in said intake manifold is positive.

* * * * *